3,418,136
METHOD OF STERILIZING A MALT BEVERAGE
Peter D. Bayne, Milwaukee, and Joseph A. Kozulis, Fox Point, Wis., assignors to Jos. Schlitz Brewing Company, Milwaukee, Wis., a corporation of Wisconsin
No Drawing. Filed July 16, 1965, Ser. No. 472,676
5 Claims. (Cl. 99—48)

ABSTRACT OF THE DISCLOSURE

A method of sterilizing a malt beverage containing less than 1% by weight of protein by adding to the beverage from 0.0005% to 0.05% by weight of 2,3-epoxypropanol.

---

This invention relates to a method of brewing and more particularly to a method of sterilizing a malt beverage, such as beer and ale.

Bottle and canned beer is normally sterilized by heat pasteurization so that the beer can be stored at room temperature or elevated temperatures without danger of micro-organism growth. Pasteurization consists of heating the beer to an elevated temperature above 140° F. for a period of time, depending on the specific temperature employed, to destroy the microorganisms. The pasteurization tends to detract from the taste characteristics of the beer so that the beer, after pasteurization, has a somewhat different flavor than unpasteurized beer.

Draft beer, on the other hand, is not pasteurized and is considered to have a more desirable flavor than pasteurized beer. However, draft beer must be kept refrigerated to prevent growth of the microoganisms and for this reason, bottle and canned beer, for the most part, is not draft brewed.

Attempts have been made in the past to chemically sterilize beer, but they have not been successful because the sterilizing materials leave noxious residues which not only have a deleterious effect on foam, odor, physical stability and flavor of the beer but are undesirable from a food and drug point of view.

The present invention is directed to a method of sterilizing beer or other malt beverages by the use of 2,3-epoxypropanol. This material, when added in precise amounts to the beer, will effectively prevent growth of microorganisms and is completely compatible with the beer, hydrolyzing after sterilization to glycerine, which is a natural component of beer. Because the 2,3-epoxypropanol hydrolyzes to form materials which are natural components of beer, no noxious residue remains which will alter the foam, stability, odor or flavor of the beer or other malt beverage.

In the past, 2,3-epoxypropanol has been used as a preservative for meat products or other high proteinaceous materials by distributing the 2,3-epoxypropanol on the surface of the product as disclosed in United States Patent 2,890,119. 2,3-epoxypropanol has also been employed to sterilize pharmaceutical compositions, as taught in United States Patent 3,143,464. In these prior art processes the 2,3-epoxypropanol has generally been used in an amount of .1% to 3% by weight of the product to achieve the desired result.

According to the invention, it has been discovered that the effectiveness of the 2,3-epoxypropanol as a sterilizing agent increases as the amount of protein in the product decreases and the effectiveness is unexpectedly and substantially improved when the protein content is below 1% by weight of the product. Unfermented brewer's wort, by nature, is low in protein material, having a protein content well below 1% by weight and during the processing of the wort, the high molecular weight protein is further reduced by hydrolytic enzymatic action to low molecular weight peptides and amino acids. The amino acids are assimilated to a large degree by the yeast during fermentation resulting in an overall decrease in the nitrogen content. The protein content of beer is generally in the range of 0.3% to 0.4% by weight. For these reasons, the sterilization effect of the 2,3-epoxypropanol, when added to beer, is remarkably increased, or conversely, the same sterilization effect can be achieved by using a substantially smaller quantity of the 2,3-epoxypropanol.

The 2,3-epoxypropanol is added in an amount of 5 to 500 p.p.m. to the beer which corresponds to a percentage of .0005% to .05% by weight. From an economical standpoint, the material is added in an amount of 20 to 100 p.p.m., with amounts above 100 p.p.m. having no practical advantage and tending to reduce the speed of sterilization.

The 2,3-epoxypropanol is thoroughly admixed with the beer until dissolved or thoroughly dispersed throughout the beer. The material may be added in undiluted form or as an aqueous solution to provide the concentration indicated above.

The 2,3-epoxypropanol acts to sterilize the beer and after sterilization, hydrolyzes in a few hours to form glycerine which is a natural constituent of the beer.

The sterilization effect of the 2,3-epoxypropanol on microorganisms in beer or ale is substantially increased over the sterilization effect of the same amount of 2,3-epoxypropanol when used in other products. This unusual result is achieved because the proteolytic enzymes in beer, including the natural enzymes native to beer, such as proteoses, polypeptidases, and peptidases, and the enzymes normally added to beer, such as papain, pepsin, bromelein, and ficin, act to decrease the molecular weight of the protein molecules, reducing them to peptides and amino acids. As the amino acids are assimilated to a large degree during fermentation by the yeast, the overall nitrogen content is further reduced. The low protein content, below 1% by weight, has been found to unexpectedly increase the effectiveness of the sterilization action of the 2,3-epoxypropanol.

The 2,3-epoxypropanol is a relatively inexpensive material which will effectively sterilize beer and will hydrolyze in a very short period of time to glycerine. The residue which is produced by hydrolysis of the 2,3-epoxypropanol is compatible with the natural constituents of beer and will not alter the odor, flavor, foam or physical stability of the beer. The 2,3-epoxypropanol can be used to sterilize either bottle or canned beer, in which case it will eliminate the heat pasteurization which is normally necessary, or it can be used to sterilize draft beer which will eliminate the need for refrigeration for the draft beer.

The following example illustrates the method of sterilizing a malt beverage by use of the 2,3-epoxypropanol.

A mixture of nine naturally occurring beer wild yeasts, bacteria and three culture yeast strains were added to beer. 2,3-epoxypropanol was dissolved in distilled water and the appropriate amount of the water solution was added to a series of empty beer bottles prior to filling with beer to provide, after filling, concentrations of the 2,3-epoxypropanol of 20, 50, 100, 300 and 500 p.p.m. respectively. In addition beer was added to a control bottle which did not contain 2,3-epoxypropanol. After bottling, the bottles were capped and incubated at room temperature. Periodically the bottles were examined after 7 days, 2 weeks and 3 months for the growth of the yeast and the bacteria using the Millipore filtration technique. The results are shown in the following table:

| Time (days) | | 2,3-epoxypropanol concentration, p.p.m. | | | | | |
|---|---|---|---|---|---|---|---|
| | | 0 (control) | 20 | 50 | 100 | 300 | 500 |
| 0 (original) | Aerobic | TNTC | TNTC | TNTC | TNTC | TNTC | TNTC |
| | Anaerobic | TNTC | TNTC | TNTC | TNTC | TNTC | TNTC |
| 7 | Aerobic | TNTC | 200 | 120 | 80 | 9 | 3 |
| | Anaerobic | TNTC | 100 | 6 | 7 | 4 | 0 |
| 14 | Aerobic | TNTC | 50 | 70 | 46 | 5 | 1 |
| | Anaerobic | TNTC | 0 | 0 | 0 | 0 | 0 |
| 90 | Aerobic | TNTC | 0 | 0 | 0 | 0 | 0 |
| | Anaerobic | TNTC | 0 | 0 | 0 | 0 | 0 |

In the above table "TNTC" means too numerous to count.

The results above show that the microorganism count of the control sample, containing no 2,3-epoxypropanol, was not reduced throughout the three-month period. In contrast to this, the samples containing various concentrations of the 2,3-epoxypropanol, from 20 to 500 p.p.m. reduced the microorganism count in all cases so that after a three-month period no microorganism count was present.

The following example illustrates the effect of the protein concentration on the effectiveness of the 2,3-epoxypropanol:

100 ml. water solutions were prepared having concentrations of 0%, 0.2%, 5.0%, and 10.0% of protein (Bacto-Peptone). To each 100 ml. solution sufficient dextrose was added to give a 0.5% solution. Each solution was inoculated with 0.5 ml. of wild yeast mixture isolated from various sources in the brewery which give 25 million cells per ml. of protein preparation. To each solution 2,3-epoxypropanol was added to give a concentration of 50 p.p.m. Corresponding control samples were prepared for each concentration of protein without the addition of the 2,3-epoxypropanol. All the samples were incubated at room temperature for 24 hours and the samples were plated using wort agar to estimate the number of the amount of yeast present. The results of the test are as follows:

| Protein concentration, percent | Yeast count (millions per ml.) | | Reduction in yeast cells, percent |
|---|---|---|---|
| | Control sample, 0% 2,3-epoxypropanol | Treated with 50 p.p.m. 2,3-epoxypropanol | |
| 0 | 24.4 | 7.8 | 68 |
| 0.2 | 43.5 | 15.5 | 64 |
| 5.0 | 38.3 | 33.6 | 13 |
| 10.0 | 41.2 | 39.4 | 4.4 |

The above test shows that the effectiveness of the 2,3-epoxypropanol as a sterilizing agent is dependent on the protein concentration. Identical concentrations of the 2,3-epoxypropanol reduced the microorganism count by 68% when the solution contained no protein while the same amount of 2,3-epoxypropanol reduced the microorganism count only 4.4% when the solution contained 10% protein. These tests substantiate the unusual and increased effectiveness of the 2,3-epoxypropanol when the protein content of the liquid is maintained at a minimum level below 1%. The 2,3-epoxypropanol is unexpectedly effective as a sterilizing agent when used in malt beverages such as beer because the unfermented wort, by nature, is low in protein and the protein content is further reduced during processing by hydrolytic enzymatic action.

Various modes of carrying out the invention are contemplated as being within the scope of the following claims particularly pointing out and distinctly claiming the subject matter which is regarded as the invention.

We claim:
1. A method of sterilizing an aqueous fermented alcoholic malt beverage containing carbohydrates and less than 1% protein which comprises admixing with the malt beverage 2,3-epoxypropanol in an amount of 5 to 500 p.p.m.

2. In a method of brewing, the steps of preparing a brewer's wort containing less than 1% protein material, reacting proteolytic enzymes with the protein material during fermentation to reduce the protein content to a value in the range of 0.3% to 0.4% by weight, and thereafter adding to the fermented wort from 0.0005% to .05% by weight of 2,3-epoxypropanol, said 2,3-epoxypropanol serving to sterilize the wort and prevent growth of microorganisms.

3. A method of sterilizing a fermented alcoholic malt beverage, comprising incorporating with the malt beverage from 20 to 100 p.p.m. of 2,3-epoxypropanol, and maintaining the malt beverage sealed from further outside contamination after the addition of said 2,3-epoxypropanol.

4. A sterilized fermented alcoholic malt beverage, comprising an aqueous malt liquid containing carbohydrates and containing less than 1% protein, said liquid having incorporated therein from 5 to 500 p.p.m. of 2,3-epoxypropanol.

5. A sterilized fermented alcoholic malt beverage, comprising a fermented wort containing from 0.3 to 0.4% protein and having incorporated therein from 0.0005% to 0.05% by weight of 2,3-epoxypropanol, said 2,3-epoxypropanol serving to sterilize the fermented wort and prevent microorganism growth.

References Cited

UNITED STATES PATENTS 2,890,119  6/1959  Minkler et al. _____ 99—150
3,048,488  8/1962  Standskov et al. _____ 99—211
3,143,464  8/1964  Riffkin et al. _____ 99—211

FOREIGN PATENTS

Nugey, A. L., Brewers Manual 1948, Jersey Printing Co., Inc., N.J. (p. 3).

A. LOUIS MONACELL, *Primary Examiner.*

D. M. NAFF, *Assistant Examiner.*

U.S. Cl. X.R.

99—31, 211; 192—3